April 14, 1942.   E. B. LEACH   2,279,472
VALVE
Filed Feb. 4, 1941   2 Sheets-Sheet 1

Inventor,
E. B. Leach
By: Glascock Downing & Seebold
Attys.

April 14, 1942.　　　　E. B. LEACH　　　　2,279,472
VALVE
Filed Feb. 4, 1941　　　　2 Sheets-Sheet 2

Inventor,
E. B. Leach
By: Glascock Downing & Seebold
Attys.

Patented Apr. 14, 1942

2,279,472

UNITED STATES PATENT OFFICE 2,279,472

VALVE

Edward Blackwell Leach, Newport, England

Application February 4, 1941, Serial No. 377,377
In Great Britain February 15, 1940

4 Claims. (Cl. 251—93)

This invention relates to valves of the kind in which lubricating means are provided, and in which an operating spindle for actuating the closure member passes through a fluid-tight seal or gland in the body, or in a part attached to the body. The primary object of the invention is to provide improved means for lubricating the seal or gland from the same source of supply as the seating surfaces of the valve.

Valves are known in which the gland is lubricated by a direct feed from the main lubricant supply, but this method has the disadvantage that in feeding the valve seating surfaces and the gland at the same time, the one is sometimes over lubricated and the other under lubricated. Valves are also known in which the gland is lubricated from an independent source, but this is not so convenient as the use of a single lubricating source.

The invention comprises a valve of the kind aforesaid having in combination means for admitting lubricant from a source of supply to the seating surfaces of the valve, and means for admitting lubricant from the said source to the seal or gland at one or more predetermined positions only of the closure member, and also, if desired, means for interrupting the supply of lubricant to the said surfaces at this predetermined position or positions. By the use of such means both disadvantages referred to above are avoided.

In the accompanying sheets of explanatory drawings.

Figure 1:
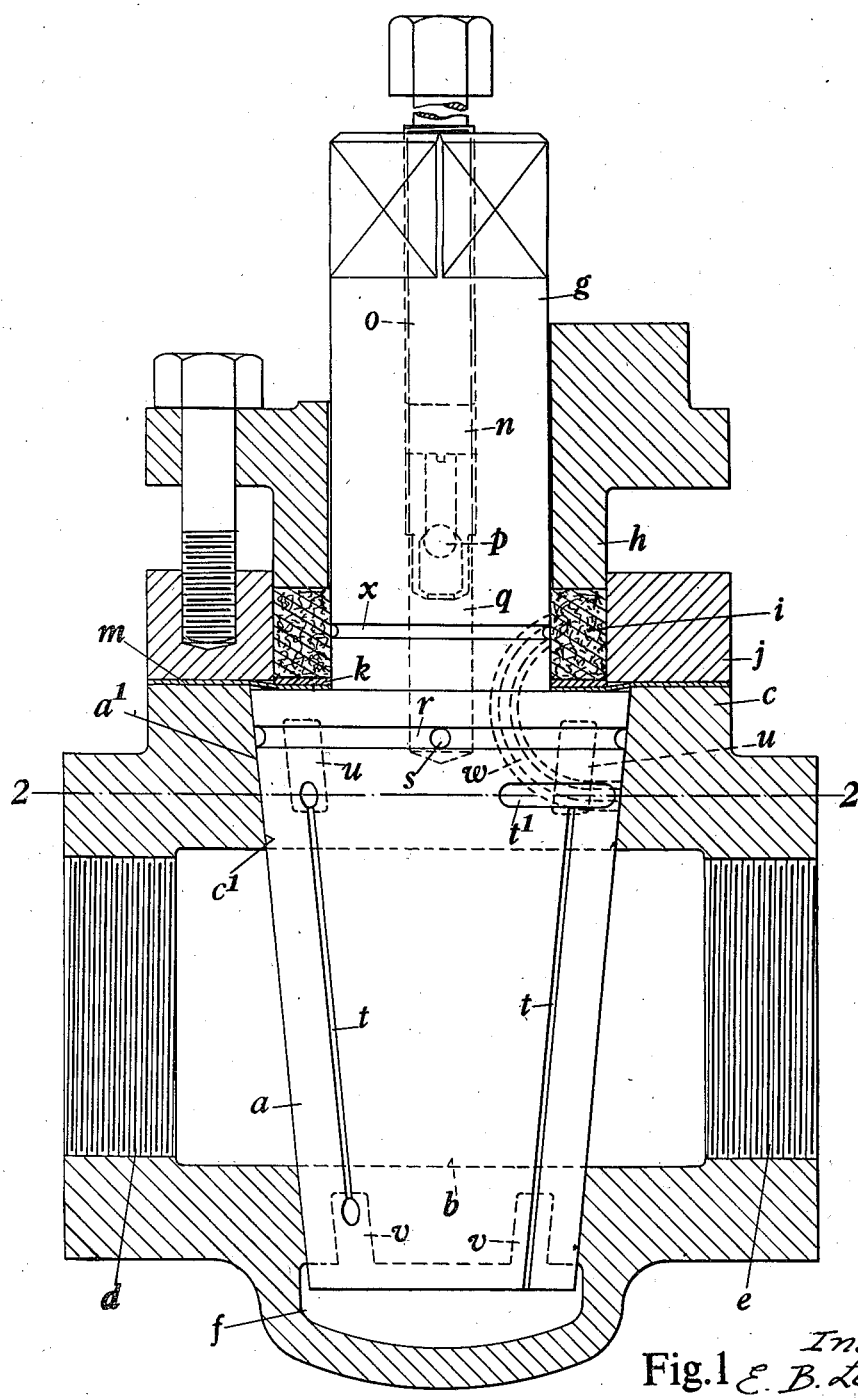
Figure 1 is a sectional elevation of a valve embodying the invention, the closure member of the valve being shown in its open position.

In carrying the invention into effect as shown, I employ a closure member in the form of a tapered rotary plug $a$ having a transverse fluid (gas or liquid) passage $b$ and mounted in the correspondingly shaped interior of a hollow body $c$, the contiguous tapered surfaces $a^1$, $c^1$ of the plug and body forming the seating surfaces of the valve. The body $c$ is provided with inlet and outlet passages $d$, $e$, with which the passage $b$ in the plug $a$ can co-operate for establishing fluid flow through the valve. At a position adjacent to the lower or smaller end of the plug $a$ the body $c$ is shaped to form a chamber $f$ which encloses that end of the plug. The upper or larger end of the plug $a$ is formed or provided with an operating spindle $g$ which passes through a fluid-tight seal or gland of any convenient form in the body, or a part attached to the body. In the example shown this seal or gland comprises an annular pressure member $h$ and an annular sealing member $i$, the latter being situated between the pressure member and the larger end of the plug $a$ in a correspondingly shaped opening formed in a part $j$ attached to the body $c$. Between the sealing member $i$ and the larger end of the plug $a$ is a washer $k$ through which the sealing member $i$ serves under the action of the pressure member $h$ to prevent axial movement of the plug, the washer being attached to a flexible annular diaphragm $m$ secured between the body $c$ and the part $j$.

The spindle $g$ is formed with an internally screw-threaded axial bore $n$ which forms a lubricant storage chamber and which is closed at its outer end by a feed screw $o$ whereby lubricant can be forced from the storage chamber past a non-return valve $p$ into a continuation $q$ of the said bore.

Around the upper or larger end of the plug $a$ is formed a circumferential groove $r$ which is connected with the inner end of the continuation $q$ of the bore in the spindle $g$ by one or more radial passages as $s$. Along the outer peripheral surface of the plug $a$ are formed four equi-spaced longitudinal grooves $t$ which flank the ends of the transverse fluid passage $b$ in the plug, and the upper ends of which are spaced from the circumferential groove $r$. Two of these grooves $t$ are situated at opposite sides of one end of the transverse passage $b$, and the other two at opposite sides of the other end. Further the upper end of each of one opposite pair of the longitudinal grooves $t$ terminates in a short segmental groove $t^1$ which subtends an angle of about 45° at the axis of the plug $a$. This pair of longitudinal grooves $t$ extend to the lower extremity of the plug $a$, and are in constant communication with the chamber $f$, the other pair of longitudinal grooves being slightly shorter and having their lower ends spaced from the lower extremity of the plug. Moreover there are formed in the larger end portion of the seating surface $c^1$ of the body $c$ four equidistant short longitudinal groves $u$ situated so that each can interconnect the circumferential groove $r$ in the plug $a$ and the upper end of one of the longitudinal grooves $t$ in the plug. Also the smaller end of the seating surface $c^1$ is formed with four equidistant short longitudinal grooves $v$ which at one end communicate with the chamber $f$ in the body $c$, these grooves being situated so that each can interconnect the said chamber and the lower end of one of the longitudinal grooves $t$ in the plug $a$.

In addition there is provided in the plug $a$ and the adjacent part of the spindle $g$ a passage $w$ which extends from a point mid-way between the upper ends of the longitudinal groves $t$ in the plug to a point in a circumferential groove $x$ formed in the spindle at a position approximately mid-way between the upper and lower extremities of the gland sealing member $i$. In the example shown the passage $w$ has the form of a tube cast into the plug $a$ and spindle $g$.

Figure 3:
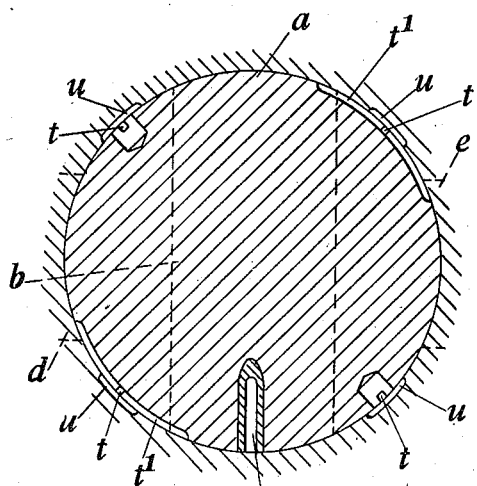
Figure 3 is a view similar to Figure 2 showing the closure member in its closed position.

At all times the short longitudinal grooves $u$ in the larger portion of the body seating surface $c^1$ are in communication with the continuation $q$ of the bore $n$ forming the storage chamber through the circumferential groove $r$ in the plug $a$ and the radial passage or passages as $s$ extending from that groove to the bore continuation. When the plug $a$ is in its closed position as shown in Figure 3, the short grooves $u$ connect the circumferential groove $r$ of the plug with the longitudinal grooves $t$ of the plug, and two of other short grooves $v$ connect the two shorter longitudinal grooves of the plug with the chamber $f$ which encloses the smaller end of the plug. This condition enables the plug grooves $t$ and the chamber $f$ to be kept fully charged with lubricant which serves to lubricate the seating surfaces $a^1$, $c^1$.

Figure 2:
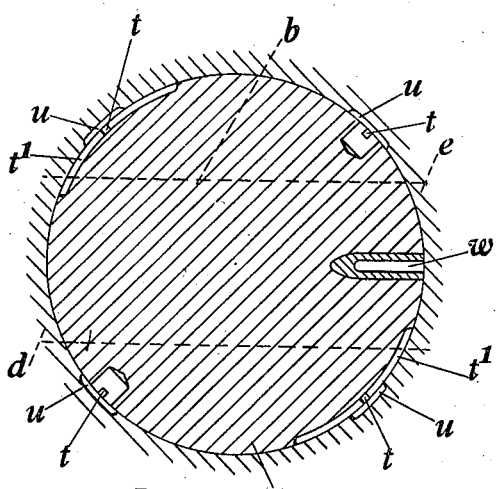
Figure 2 is a section on the line 2—2 of Figure 1.

On rotating the plug $a$ to the open position shown in Figures 1 and 2 communication is immediately interrupted between the shorter plug grooves $t$ and the adjacent short body grooves $v$, and also between this pair of these plug grooves and the adjacent short body grooves $u$. But communication between the other pair of short body grooves $u$ and the two longer plug grooves $t$ is maintained through the above-mentioned segmental grooves $t^1$ until the plug has passed through about 40°.

Thereafter all of the longitudinal grooves $t$ of the plug are isolated from the body grooves $u$ until the plug has passed through a further 10° or thereabouts when the two segmental grooves $t^1$ and their associated longitudinal grooves $t$ communicate with the adjacent body grooves $u$. When the plug $a$ reaches the fully open position communication between the other pair of longitudinal plug grooves $t$ and body grooves $u$ is established. On returning the plug $a$ to its closed position a similar sequence of events is repeated.

When the plug $a$ has been moved through about 45° from either its fully open or its fully closed position, the lower end of the passage $w$ leading to the circumferential groove $x$ in the spindle $g$ comes opposite to one of the short grooves $u$ in the body $c$ and permits lubricant to be fed from the storage chamber $n$ to the gland sealing member $i$ so allowing the latter to receive a supply of lubricant, and thereby minimising friction and risk of corrosion between the spindle and gland.

From the foregoing it will be seen that the valve shown in the drawings permits lubricant to be supplied from the storage chamber to the seal or gland only when the plug is in a predetermined position. But by appropriate modification such supply can be effected at more than one predetermined position of the plug.

By this invention satisfactory lubrication and sealing of the principal surfaces of the valve is effected in a very simple and convenient manner.

Whilst in the foregoing I have described one form of my invention in which means for lubricating both plug and body seating surfaces and the seal or gland are provided, I desire it to be understood that the main and essential feature of novelty in the present invention is associated with the means for lubricating the seal or gland from the storage chamber of the sealing surface lubricant supply only at one or more predetermined positions of the valve. Also when desirable, the feed to the seating surfaces is interrupted at these predetermined positions. Moreover I desire it to be understood that the invention is not limited to the above described example, as subordinate details concerning disposition of the grooves and passages may be varied. Also the invention may be applied to any type of valve of the kind specified.

Having thus described my invention what I claim as new and desire to secure by Letters Patent is:

1. A valve comprising in combination a hollow body provided with inlet and outlet openings, a closure member in the form of a plug rotatably mounted in the body and provided with a transverse passage for controlling communication between the said inlet and outlet openings, an operating spindle on the closure member, a fluid tight seal through which the spindle passes, a lubricant storage chamber in the spindle, the outer peripheral surface of the closure member and the corresponding inner surface of the body which form the seating surfaces of the valve being provided with interconnectible grooves to which lubricant can be supplied from the said chamber, and a passage adapted by cooperation with one of the said grooves to enable lubricant to be supplied to the seal gland when the closure member is in a predetermined position.

2. A valve as claimed in claim 1, in which the grooves and passage are arranged so that the supply of lubricant to the seating surfaces is interrupted when lubricant is supplied to the seal.

3. A valve as claimed in claim 1, in which the closure member is provided with a circumferential groove connected by at least one radial passage to the lubricant storage chamber, four equispaced longitudinal grooves two of which terminate in segmental grooves at the ends adjacent to the circumferential groove, and a passage leading from a position between the latter ends of two of the longitudinal grooves through the adjacent part of the plug operating spindle to the seal through which the spindle passes, the inner surface of the valve body being formed with four equidistant grooves which serve to interconnect the circumferential groove and the adjacent ends of the longitudinal grooves when the plug is in its fully open or fully closed position, and one of which serves to interconnect the said circumferential groove and passage when the plug is in a predetermined intermediate position.

4. A valve comprising in combination a body and a closure member having contiguous seating surfaces, an operating spindle for actuating the closure member, a fluid-tight seal through which the spindle passes, a source of lubricant supply, means for admitting lubricant from the said source to the said seating surfaces, means controlled by the closure member for admitting lubricant from the said source to the said seal, and means for interrupting the supply of lubricant to the said seating surfaces when the closure member is in position for enabling lubricant to be supplied to the seal.

EDWARD BLACKWELL LEACH.